(12) United States Patent
Cote et al.

(10) Patent No.: US 7,603,393 B1
(45) Date of Patent: Oct. 13, 2009

(54) SOFTWARE MERGING UTILITY

(75) Inventors: Marlene Cote, Chelmsford, MA (US);
Philip S. Kasten, Nashua, NH (US);
Edward A. Heiner, Jr., Nashua, NH (US); Eric L. Peterson, Carlisle, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 248 days.

(21) Appl. No.: 11/695,366

(22) Filed: Apr. 2, 2007

(51) Int. Cl.
*G06F 17/30* (2006.01)
(52) U.S. Cl. .................. 707/203; 715/229; 717/122
(58) Field of Classification Search .......... 707/1, 707/100, 200, 203; 715/229, 744; 717/101, 717/122, 170

See application file for complete search history.

(56) References Cited

U.S. PATENT DOCUMENTS 5,574,898 A * 11/1996 Leblang et al. ............. 707/1
7,278,106 B1 * 10/2007 Mason .................... 715/744

OTHER PUBLICATIONS

SCI, SCI Store merge/Umerge—Installation and Configuration Guide, 2004, SCI, pp. 1-15.*

* cited by examiner

*Primary Examiner*—Fred I Ehichioya
(74) *Attorney, Agent, or Firm*—Harrity & Harrity, LLP

(57) ABSTRACT

A method and system merging a file across multiple versions of the file is provided. A file check-in request is identified. A merge candidate associated with the file is automatically identified. A view associated with the identified merge candidate is automatically identified. The file is merged with the merge candidate in the view, resulting in a merge result.

18 Claims, 4 Drawing Sheets

SOFTWARE MERGING UTILITY

BACKGROUND

1. Field of the Disclosure

The present disclosure relates generally to software configuration management or versioning systems and more specifically to efficiently merging software changes between multiple versions of software maintained in the versioning system.

2. Description of the Related Art

Configuration management plays an important role in the development of most software products. In particular, configuration management tools, such as ClearCase, AccuRev, Bazaar, etc. provide versioning tools that regulate and manage how software is developed by tracking the updates and modifications that are made to the software components managed by the tools.

For example, in a typical software development project, for a particular product or software release, many different software components or elements may need to be generated. Because multiple developers and potentially development teams may be involved in the creation or implementation of the various software elements, the software developers are typically allowed to access and modify many of the same software components in parallel to each other. To provide for common access, the software components are commonly maintained in a data repository that is accessible by the different software developers.

Files being modified are typically checked-out of the versioning system and checked back in as new versions upon completion. Unfortunately, due to the parallel nature of the overall development, beneficial or desirable changes made in one version or branch of the development may not be integrated or merged into other branches. Many versioning systems include merge features for merging changes between various branches or components. However, these features typically require significant user intervention and express identification of merge locations.

SUMMARY

One aspect is directed to a method for merging a file across multiple versions of the file. A file check-in request is identified. A merge candidate associated with the file is automatically identified. A view associated with the identified merge candidate is automatically identified. The file is merged with the merge candidate in the view, resulting in a merge result.

Another aspect is directed to a system including a file repository configured to store a first data structure including merge relationships between more than one version of the file; and a merge utility configured to automatically initiate merging of a first version of a file with a second version of the file in a versioning system based on the merge relationships maintained in the first data structure, where the versioning system is configured to maintain the more than one version of the file.

Yet another aspect is directed to a computer-readable medium containing programming instructions that when executed by a computing device cause the computing device to identify a request to check-in a first version of a file in a software versioning system; automatically identify merge candidates associated with the first version of the file based on a stored listing of merge candidate relationships; automatically identify a view based on stored view configuration information associated with each version of the file; initiate starting of views associated with each of the identified merge candidates in the software versioning system; initiate merging of the first version of the file with the identified merge candidates in the identified views, resulting in merge results for each merge candidate; initiate building of each merge result; and initiate check-in of the built merge results.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description refers to the accompanying drawings. The detailed description does not limit the invention.

Aspects of the invention relate to a software development tool. The software development tool described herein facilitates efficient merging or migration of software revisions amongst various potentially interconnected versions or iterations of a software application or piece of software code.

Overview

Figure 1:
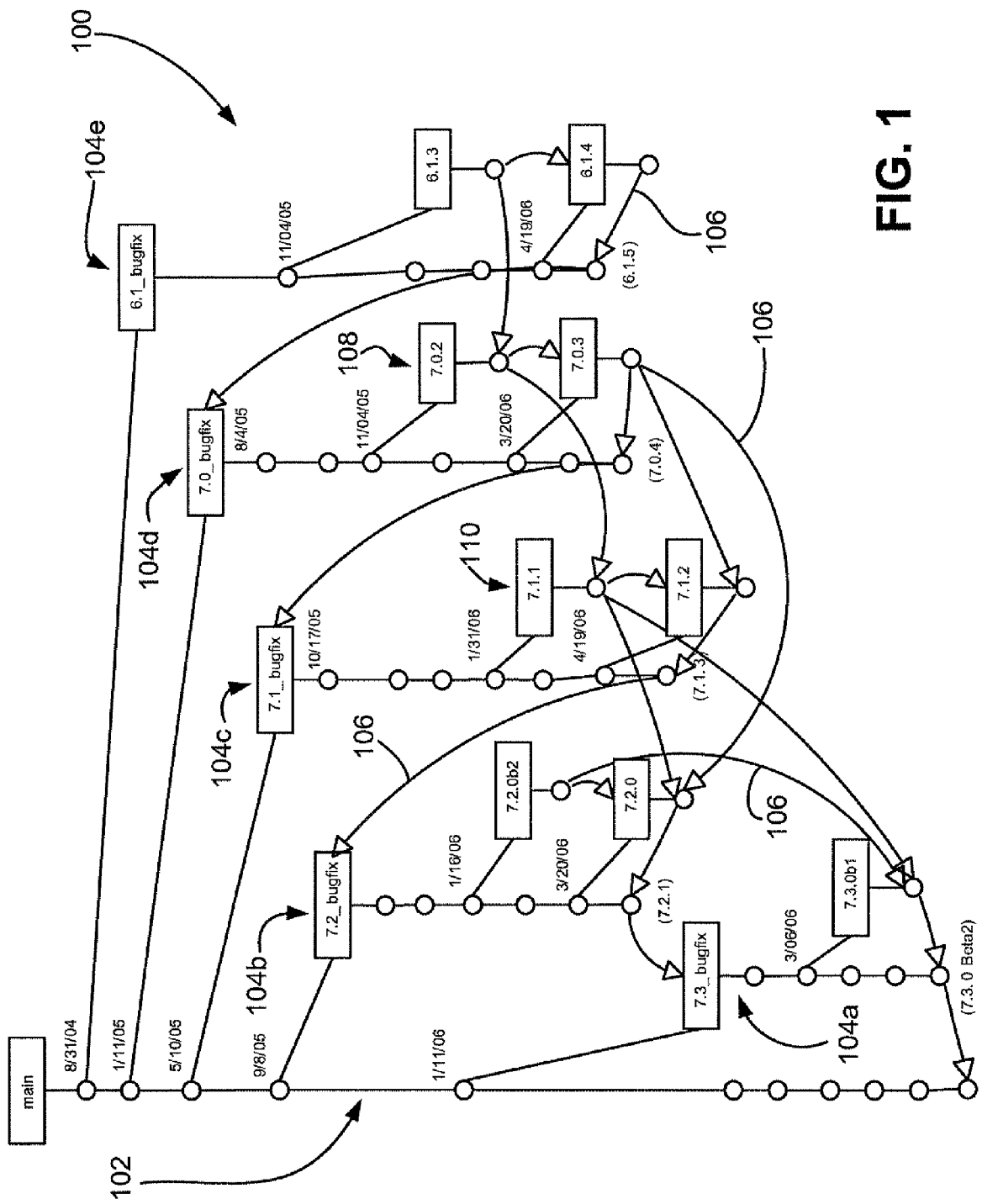
FIG. 1 is a conceptual illustration depicting relationships between versions or releases of a piece of software code.

FIG. 1 is a conceptual illustration depicting relationships between versions or releases of a piece of software code. As more fully described herein, multiple versions of a software application or system may be schematically illustrated as a versioning tree 100 having a mainline 102, and a number of branches 104a, 104b, 104c, 104d, and 104e (collectively referred to as branches 104). As is known, each branch 104 in versioning tree 100 may represent a different version of software developed or modified in parallel to other branches 104 or mainline 102. For example, in FIG. 1, mainline 102 may include released software, while each branch 104 may include modifications to the released software, such as patches, bug fixes, specialized versions, etc.

In one implementation, software developers may establish or reference a "view" thereby enabling the developer to "check out" software files for modification. While checked-out, changes to the file or data are invisible to other developers. Each "view" may be configured to identify a location of those files being modified or otherwise worked on. Upon completion of the modification, the developer may "check-in" the file, thereby making the file accessible to other software developers or usable in building actual executable software code. Upon check-in, a new version of the software may be created, either in an existing line, or as a new branch, depending on the manner in which the file was checked out and checked back in. In this manner, development of each individual line (e.g., mainline 102 or one of branches 104) may continue in parallel along with development of any other line. This style of software development greatly enhances the efficiency and flexibility with which departures in software development may be addressed.

As is known, once modifications to any line have been finalized, it may be desirable to incorporate the changes into a number of branches 104. This process is generally referred to as "merging" and typically involves conducting a line-by-line comparison along a software development line for changes implemented or otherwise impacted by the subject modifications. In a ClearCase® implementation, the command associated with this type of functionality is the "findmerge" command.

Unfortunately, known merging tools do not sufficiently enable identification and merging of software modifications across multiple branches 104. Rather, a developer is generally required to manually trigger the merging of the software modifications by conducting a findmerge command (or similar command in non-ClearCase® implementations) for each potential merge candidate. This process is error-prone in that it requires significant manual data entry by developers. Additionally, the execution of the findmerge command requires knowledge of the findmerge command's attributes and other features, some of which may be unknown or mistakenly implemented by a developer desiring to merge software changes (or identify potential merge candidates) across multiple branches.

As shown in FIG. 1, potential merges between branches 104 and mainline 102 may be graphically represented by a number of merge arrows 106. Each merge arrow 106 represents at least one element of shared software code between the starting point location and the ending point location. For example, patch release 7.0.4 at the end of branch 104*d* may merge to the initial 7.1_bugfix branch 104*c*, thereby implying that changes resulting from the development of branch 104*d* may be applied to the development of each element of branch 104*c*. Furthermore, modifications from a sub-branch 108 of branch 104*d* may also be applied to the elements of sub-branch 110 of branch 104*c*.

As described in detail below, a software merge utility may enable automatic merging of software changes across any number of branches and sub-branches without requiring manual entry of either file or branch locations or findmerge command attributes. In implementing the merge utility, data representative of each potential merge represented by graphical merge arrows 106 may be stored in a database available to the software merge utility. In addition, data representing specifications for each branch 104 or sub-branch 106 may be stored in another database file available to the merging utility. By using each of these data structures, the merging utility may facilitate identification or potential merges and actual merging of software changes across entire merge tree 100 automatically upon check-in of a file.

System Description

Figure 2:
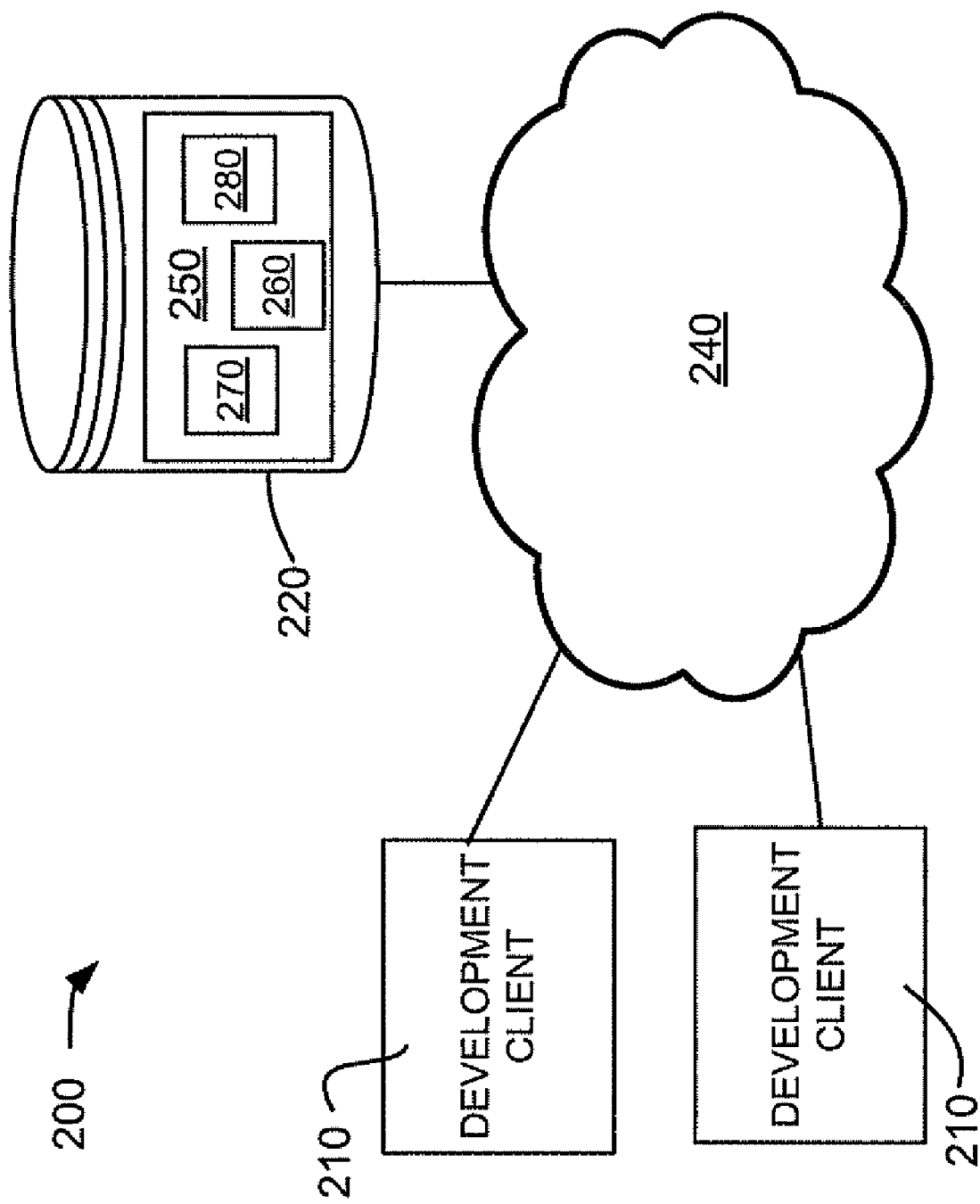
FIG. 2 is an exemplary diagram of a system illustrating aspects described herein.

FIG. 2 is a diagram of an exemplary system 200. System 200 may include multiple software development clients 210 that may connect to a data repository 220 via a network 240. Network 240 may include a local area network (LAN), a wide area network (WAN), a telephone network, such as the Public Switched Telephone Network (PSTN), an intranet, the Internet, or a combination of networks. Two software development clients 210 and one data repository 220 are illustrated as connected to network 240 for simplicity. In practice, system 200 may include any suitable number of development clients 210 and data repositories 220.

Development clients 210 may include a device, such as a personal computer, a lap top computer, a wireless telephone, a personal digital assistant (PDA), or another type of computation or communication device.

Data repository 220 may include a software versioning system 250, such as ClearCase® for facilitating parallel development and storage of computer software files or data. More specifically, versioning system 250 may include a versioned object base (VOB) 260 including information or data available to each version of the software associated therewith. Accordingly, each version of the software, whether in a single branch or across multiple branches, may reference data contained in the VOB.

As described above in FIG. 1, versioning system 250 may facilitate the establishment and maintenance of multiple versions, branches, and sub-branches for a particular piece of software. To facilitate efficient merging between these elements, relationships between elements in a branch (e.g., branches 104 of FIG. 1) may be stored in a first database or data structure 270 maintained in data repository 220. More specifically, view configuration specifications relating to each target element may be maintained. A view configuration generally refers to a set of rules that define a workspace in which a software element may be checked-out in one of the lines of versioning tree 200. Additionally, a second database or data structure 280 maintained in data repository 220 may include potential merge relationships (for example, as identified by merge arrows 106 in FIG. 1) between various branches or sub-branches.

Exemplary Computing Device Architecture

Figure 3:
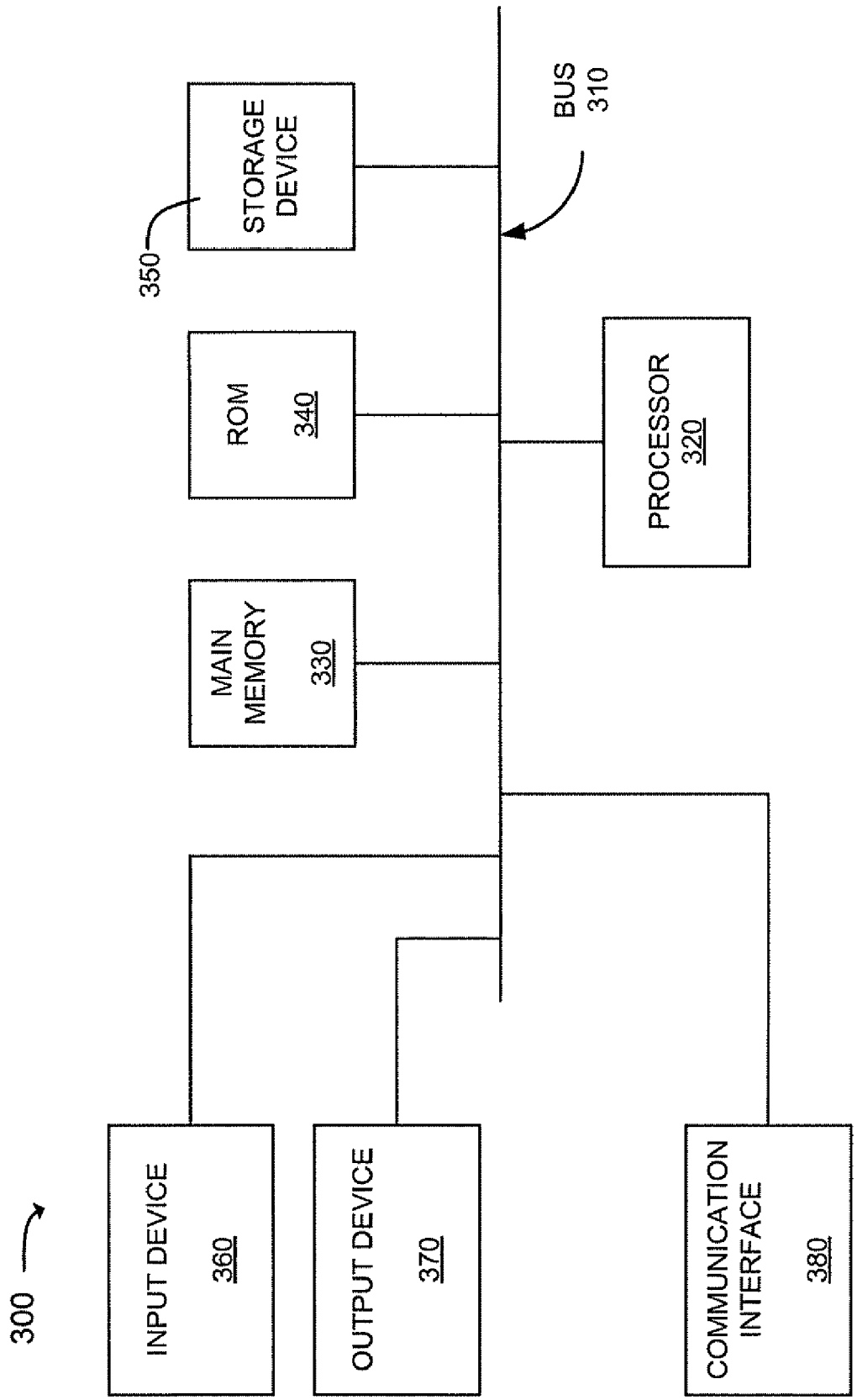
FIG. 3 is a diagram illustrating one of the devices of FIG. 2.

FIG. 3 is an exemplary diagram of a computing device 300, such as one of development clients 210 or data repository 220. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that interprets and executes instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include one or more magnetic and/or optical recording medium and its corresponding drive.

Input device 360 may include a mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

The merge utility described herein may be implemented in software and stored in a computer-readable medium, such as memory 330. A computer-readable medium may be defined as one or more physical or logical memory devices and/or carrier waves.

The software instructions defining the merge utility may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Exemplary Processing

Figure 4:
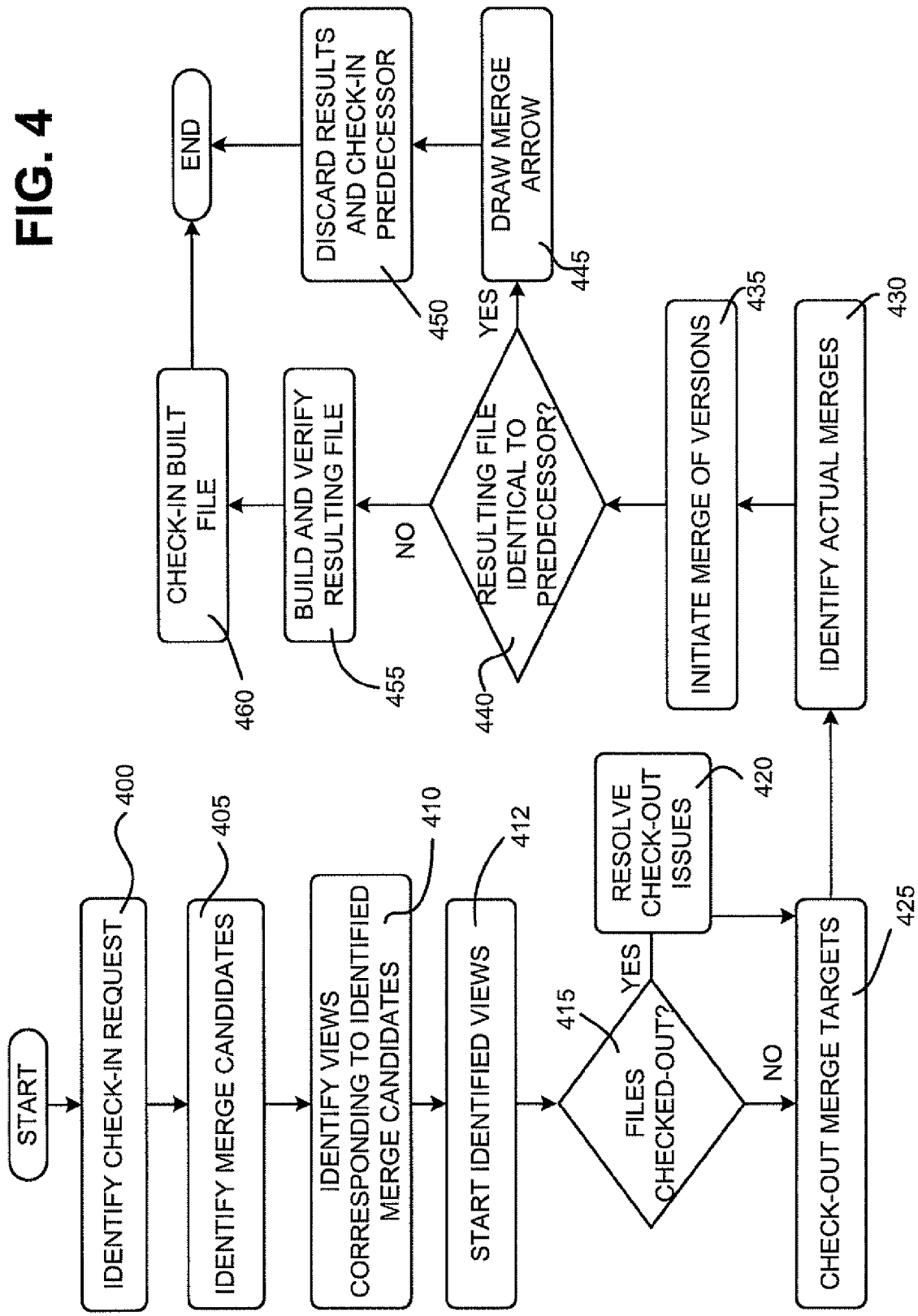
FIG. 4 is a flowchart of an exemplary process for automatically merging a file or other software element across multiple branches or sub-branches in a versioning system.

FIG. 4 is a flowchart of an exemplary process for automatically merging a file or other software element across multiple branches or sub-branches in a versioning system. The processing of FIG. 4 may be performed by one or more software and/or hardware components within development clients 210 or data repository 220.

Processing may begin with identification of a request or command to check-in a file or software element (act 400). As is known, conventional check-in processes result in creation of a new version or element in a selected view. For example, if a developer's current view included the latest element in 7.0-bugfix branch 104d, a check-in may result in creation of a new element below element (7.0.4).

Upon file check-in, the merge utility may be initiated by examining the contents of database 280 to identify those elements potentially implicated by the check-in (act 405). In one implementation, database 280 may include a listing of potential version merge implications. For example database 280 may include a listing of starting points and potential merge branches for each element in tree 200. Exemplary contents database 280 are included in Table 1, set forth below.

TABLE 1

| Merge From | Merge To |
| --- | --- |
| 6.1.3 | 6.1.4 |
| 6.1.4 | 6.1.5 |
| 6.1.5 | 7.0_bugfix |
| 6.1.4 | 7.2.1 |
| 6.1.4 | 7.1.3 |
| 6.1.4 | 7.0.4 |
| 6.1.3 | 7.0.3 |
| 7.0.0 | 7.0.1 |
| 7.0.1 | 7.0.2 |
| 7.0.2 | 7.0.3 |
| 7.0.3 | 7.1.2 |
| 7.0.3 | 7.0.4 |
| 7.0.4 | 7.2.2 |

As shown in Table 1, the left column identifies starting branches or sub-branches from which merges may be initiated and the right column identifies target branches or sub-branches into which the check-in files may have merge implications. Each of these relationships may be represented by a merge arrow 106 in FIG. 1. In one exemplary implementation, the merge utility may be further enhanced by providing the ability to locate files that have been renamed or moved between the various branches or sub-branches. By providing such functionality, all potential merge candidates may be accurate identified regardless of the associated file name or location within a branch.

Using the information provided in Table 1, it may be determined, for example, that a merge from branch 6.1.3 may have possible merge implications with branches 6.1.4, 6.1.5, 7.0-bugfix, 7.2.1. 7.0.4, and 7.2.2. For each identified branch or sub-branch, a branch view referencing the identified branch may be retrieved from the contents of database 270 (act 410). In order to check-out and merge into an identified branch, a view that includes the desired branch/file should be identified. As described above, database 270 may include branch views for each branch or line within versioning tree 200. One exemplary branch view file structure may include entries having the following form:

6.1.4:
element*CHECKEDOUT
element* . . . \6.1.4\LATEST
element*6.1.4_FREEZE-mkbranch 6.1.4
element*\main\0-mkbranch 6.1.4
6.1.5:
element*CHECKEDOUT
element* . . . \6.1.5\LATEST
element*6.1.5_FREEZE-mkbranch 6.1.5
element*\main\0-mkbranch 6.1.5
7.0_bugfix:
element*CHECKEDOUT
element* . . . \7.0_bugfix\LATEST
element*7.0BF_FREEZE-mkbranch 7.0_bugfix
element*\main\0-mkbranch 7.0_bugfix
.
.
.

As shown above, each entry in database 270 may include view configurations for a branch or sub-branch within versioning tree 200.

Once views associated with each branch or sub-branch identified in act 405 have been identified, views associated with the identified branches or sub-branches may be started (act 412). It may then be determined whether the files to be merged into are currently checked-out (act 415). It should be noted that file merger may occur on a file-by-file basis and not all identified merges may be performed simultaneously. Accordingly, for files that are currently checked-in, processing will immediately continue to act 425. Otherwise, check-out resolution may be required at act 420. Only currently checked-in files may be merged into. If any merged-into files are checked out, resolution of the checked-out status may be performed (act 420). Exemplary check-out resolutions may include unilateral check-in of currently checked-out file or notification and request for check-in. In the unilateral check-in implementation, an administrator may "unreserve" a currently checked-out file. This action may result in the user who initially checked out the filed being notified (e.g., via email) that their file has been unreserved and checked back in to allow a merge operation to be performed.

Potential merge targets may be checked-out (act 425). This enables subsequent merger and check-in of the merged files. The merge utility may then identify any actual merges between the merged-from branch and the merged-to branches based on the branches identified in act 405 and within the views identified in act 410 (act 430). In a ClearCase® implementation, act 430 may include generation of a findmerge command to the underlying ClearCase application. The generated command would specifically identify each merged-from and merged-to file and would receive in response results indicating any merger candidates identified within the Clear-Case application. As is known, a ClearCase findmerge command triggers a line-by-line comparison between the merge-from file and the merge-to file, with differences identifying merge candidates. ClearCase, however, typically writes these differences to a log file and does not initiate actual merger of the files.

Merging of identified merge candidates may be initiated (act 435). It may then be determined whether a resulting merged file is identical to its predecessor file (act 440). If so, a merge arrow between the merged-from branch and the merged-to branch is generated within ClearCase® (act 445). Additionally, the resulting merged file may be discarded and the merged-to file may be checked back in without modification (act 450). If a resulting merged file is not identical to its predecessor file, the resulting file may be built and verified (act 455). In one implementation, this may be a developer-selected option during execution of the merge utility. In another implementation, building of merged files may be performed automatically.

Following building of the merged files, the resulting files may be checked-in to the merged-to branches (act 460). This step makes the results of the merger public and available to other developers. At this point, absent unresolved check-out issues identified in act 415, all merges have been identified and performed without requiring explicit entry of merged-to locations and files by a developer. Rather, the merging utility has identified all potential merge candidates, facilitated resolution of ownership and check-in issues, and facilitated the merging, building, and check-in of the identified candidates.

CONCLUSION

A system and method for facilitating efficient merging of software changes between multiple versions of computer software is described herein.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the versioning system herein included ClearCase®, it should be understood that additional versioning systems may be similarly used.

Moreover, while series of acts have been described with regard to FIG. 4, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    storing, via a computer device, data associated with a version tree representing relationships between multiple versions of a file, the version tree including a plurality of branches, where the version tree includes a listing of merge-from branches to merge-to branches and where each of the merge-from and merge-to branches are associated with a same file;
    identifying, via the computer device, a file check-in request associated with a first version of the file;
    in response to identifying the file check-in request, automatically identifying, via the computer device, a merge candidate associated with the first version of the file where identifying the merge candidate includes:
        determining a first portion in the version tree associated with the first version of the file, and
        selecting one of the multiple versions based on the first portion of the version tree, where a second portion of the version tree is associated with the merge candidate;
    automatically identifying, via the computer device, a view associated with the merge candidate, where the view includes data indicating the first portion and the second portion;
    merging, via a computer device, the first portion of the file with the merge candidate in the view, resulting in a merge result, and
    storing, via the computer device, the merge result;
    wherein the automatically identifying the view associated with the identified merge candidate further comprises:
    examining a second data structure including configuration specifications identifying views associated with each of the multiple versions of the file;
    identifying the view associated with the identified merge candidate from among the views associated with each of the multiple versions; and
    starting the view associated with the identified merge candidate.

2. The method of claim 1, further comprising:
    building, via the computer device, the merge result.

3. The method of claim 1, where the file includes a first version and the merge candidate is a second file associated with a second version of the file.

4. The method of claim 3, where merging the file further comprises:
    checking-out the second file; and
    merging the file with the second file to generate the merge result; and
    checking-in the merge result as a new version of the merge candidate.

5. The method of claim 4, where checking-out the second file further comprises:
    determining whether the second file is currently checked-out; and
    checking-out the second file when it is determined that the second file is not currently checked-out.

6. The method of claim 5, further comprising:
    checking-in the second file when it is determined that the second file is currently checked-out; and
    checking-out the second file to enable the merging.

7. The method of claim 1, where merging the file with the merge candidate further comprises:
    generating a findmerge command to an underlying versioning system;
    receiving results from the findmerge command from the versioning system; and
    initiating merger of the file with the merge candidate in the versioning system based on the results.

8. The method of claim 1, where merging the file with the merge candidate further comprises:

determining whether the merge result matches a previous version of the merge candidate; and discarding the merge result when it is determined that the merge result matches a previous version of the merge candidate.

9. The method of claim 1, where the multiple versions of the file are maintained in parallel branches in a software versioning system.

10. A device, comprising:
a processor to:
to store, via a file repository, a first data structure including merge relationships between more than one version of a file in the file repository, where the first data structure includes a version tree representing the relationships between the more than one version of the file, the version tree including a plurality of branches, where the version tree includes a listing of merge-from branches to merge-to branches and where each of the merge-from and merge-to branches are associated with a same file;
identify a first version of the file,
select a second version of the file based on the merge relationship in the version tree between the second version of the file to the first version of the file; and
automatically initiate merging of the first version of a file with the second version of the file in a versioning system based on the merge relationships maintained in the first data structure,
where the versioning system device is to maintain the more than one version of the file, including the first version and the second version;
wherein the processor is further configured to:
store, via the file repository, a second data structure including view configuration information for each of the more than one version of the file;
identify a view from the second data structure associated with the second version of the file;
initiate opening of the view associated with the second version of the file in the versioning system; and
initiate, via the merge utility, merging of the first version of a file with a second version of the file in the opened view within the versioning system based on the merge relationships maintained in the first data structure.

11. The device of claim 10, where the more than one version of the file are stored in parallel branches in the versioning system.

12. The device of claim 10, wherein the processor is further configured to:
compare results of the merging with a previous version of the second version of the file; and
discard the results of the merging when the results of the merging are identical to the previous version.

13. The device of claim 10, wherein the processor is further configured to:
determine whether the second version of the file is currently checked-out; and
initiate merging of the first version of a file with a second version of the file in the opened view within the versioning system based on the merge relationships maintained in the first data structure when it is determined that the second version of the file is not currently checked-out.

14. The device of claim 13, where the second version of the file is checked-out prior to initiating merging of the first version of the file with the second version of the file.

15. The device of claim 13, where the processor is further to notify an owner of a currently checked-out document that check-in of the document is requested.

16. The device of claim 13, where the processor is further to:
check-in the currently checked-out document without the owner's permission.

17. The device of claim 10, where the processor is further to:
automatically initiate merging of the first version of a file with the second version of the file when it is determined that the first version of the file is being checked-in.

18. One or more physical memory devices containing programming instructions that when executed by a computing device cause the computing device to:
identify a request to check-in a first version of a file;
automatically identify merge candidates associated with the first version of the file based on a stored listing of merge candidate relationships, where the stored listing of the merge candidate relationships includes a version tree representing relationships between multiple versions of the file, the version tree including a plurality of branches, where the version tree includes a listing of merge-from branches to merge-to branches and where each of the merge-from and merge-to branches are associated with a same file, and where automatically identifying the merge candidates includes:
determining a first portion in the version tree associated with the first version of the file, and
selecting others of the multiple versions based on the first portion of the version tree, where a second portion of the version tree is associated with each of the merge candidates;
automatically identify a view based on stored view configuration information associated with each version of the file, where the view includes data indicating a portion of the version tree associated with each version of the file;
initiate starting of views associated with each of the identified merge candidates, where the view associated with each of the identified merge candidates includes data indicating the second portion of the version tree associated with each of the merge candidates;
initiate merging of the first version of the file with the identified merge candidates in the identified views, resulting in merge results for each merge candidate;
initiate building of each merge result; and
initiate check-in of the built merge results
wherein the instructions cause the computing device to:
determine whether the merge result for a merge candidate is identical to a prior version of the merge candidate; and
discard the merge result for the merge candidate when it is determined that the merge candidate is identical to prior version of the merge candidate.

* * * * *